United States Patent [19]
Hobbins

[11] 3,765,261
[45] Oct. 16, 1973

[54] UNITARY STICK TRANSFER CASE SHIFTER

[75] Inventor: James F. Hobbins, Philadelphia, Pa.

[73] Assignee: Hurst Performance, Inc., Warminster, Pa.

[22] Filed: Jan. 2, 1973

[21] Appl. No.: 320,059

[52] U.S. Cl. .................................. 74/477, 180/44 R
[51] Int. Cl. ...... G05g 5/10, G05g 9/08, B60k 17/34
[58] Field of Search .................. 74/473 R, 475, 476, 74/477; 180/44 R, 49

[56] References Cited
UNITED STATES PATENTS

| | | | |
|---|---|---|---|
| 2,228,581 | 1/1941 | Olen | 180/44 R |
| 2,933,947 | 4/1960 | Shawley et al. | 180/44 R |
| 2,961,890 | 11/1960 | Marshall | 74/477 |
| 3,057,222 | 10/1962 | Almquist, Jr. | 74/477 X |
| 3,367,204 | 2/1968 | Chadwick | 74/477 |

Primary Examiner—Allan D. Herrmann
Attorney—George R. Clark

[57] ABSTRACT

An inline stick shifter for controlling the gear range and differential operation in a transfer case for a four-wheel drive vehicle. The shift lever is movable in a single plane to operate the two controls on the transfer case through a combination of high and low gear range with the differential between the front axle and rear axle drives either locked or unlocked. A pair of shift arms are provided for driving the transfer case controls with interlock plates immobilizing one of the shift arms while the other is being controlled by the manually operated shift control lever.

10 Claims, 17 Drawing Figures

PATENTED OCT 16 1973 3,765,261

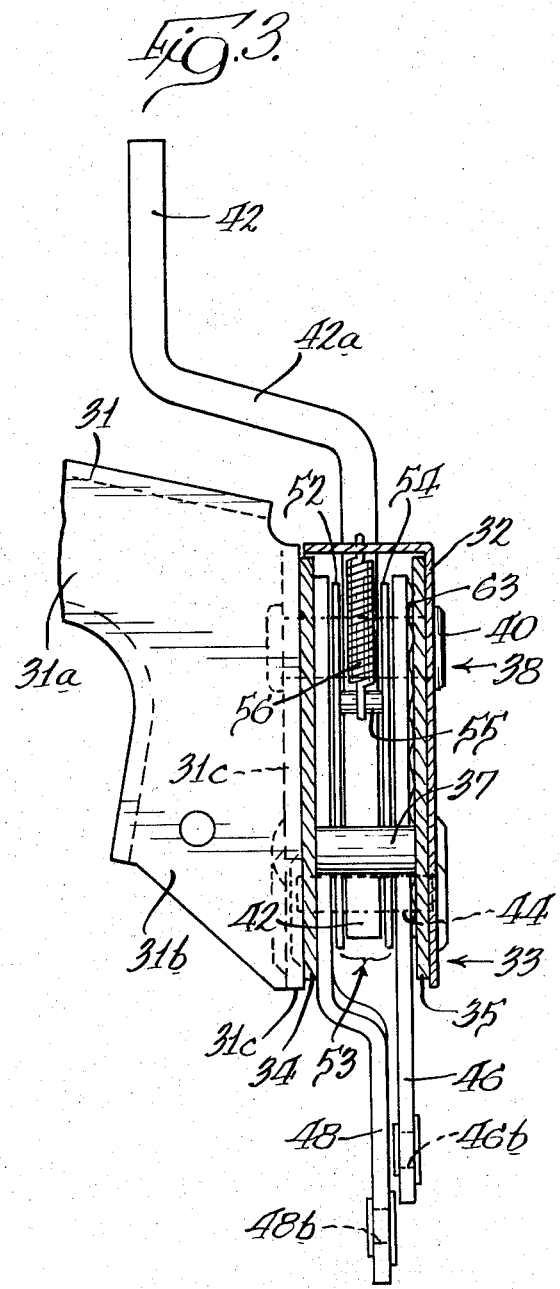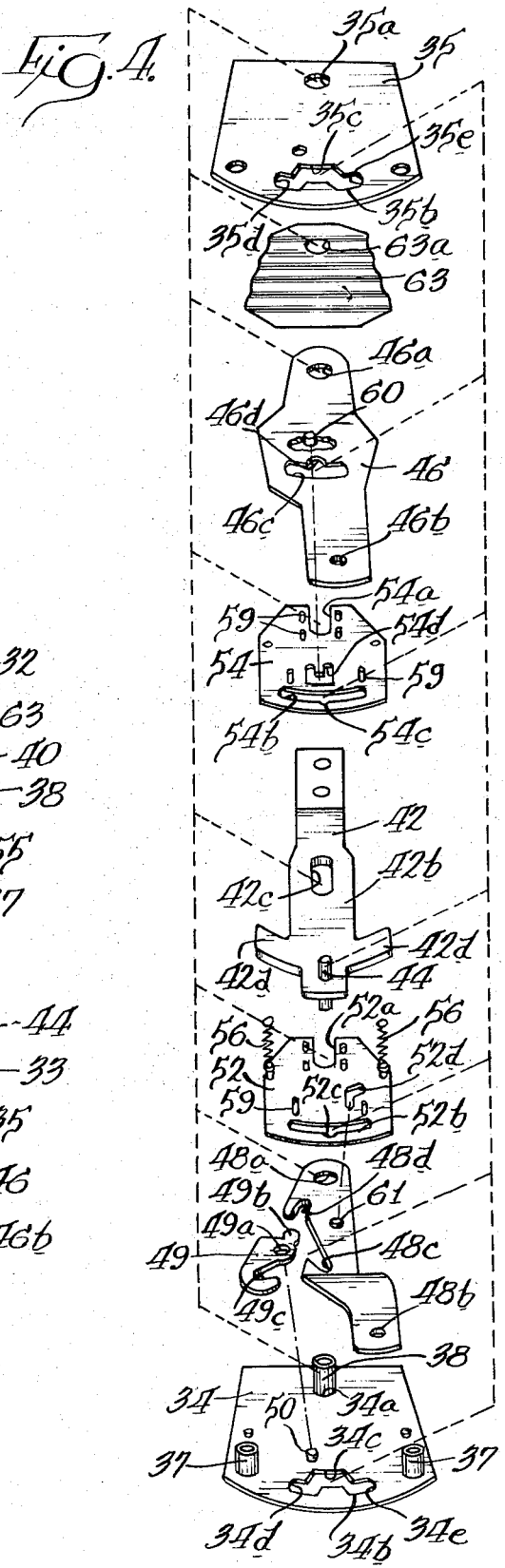

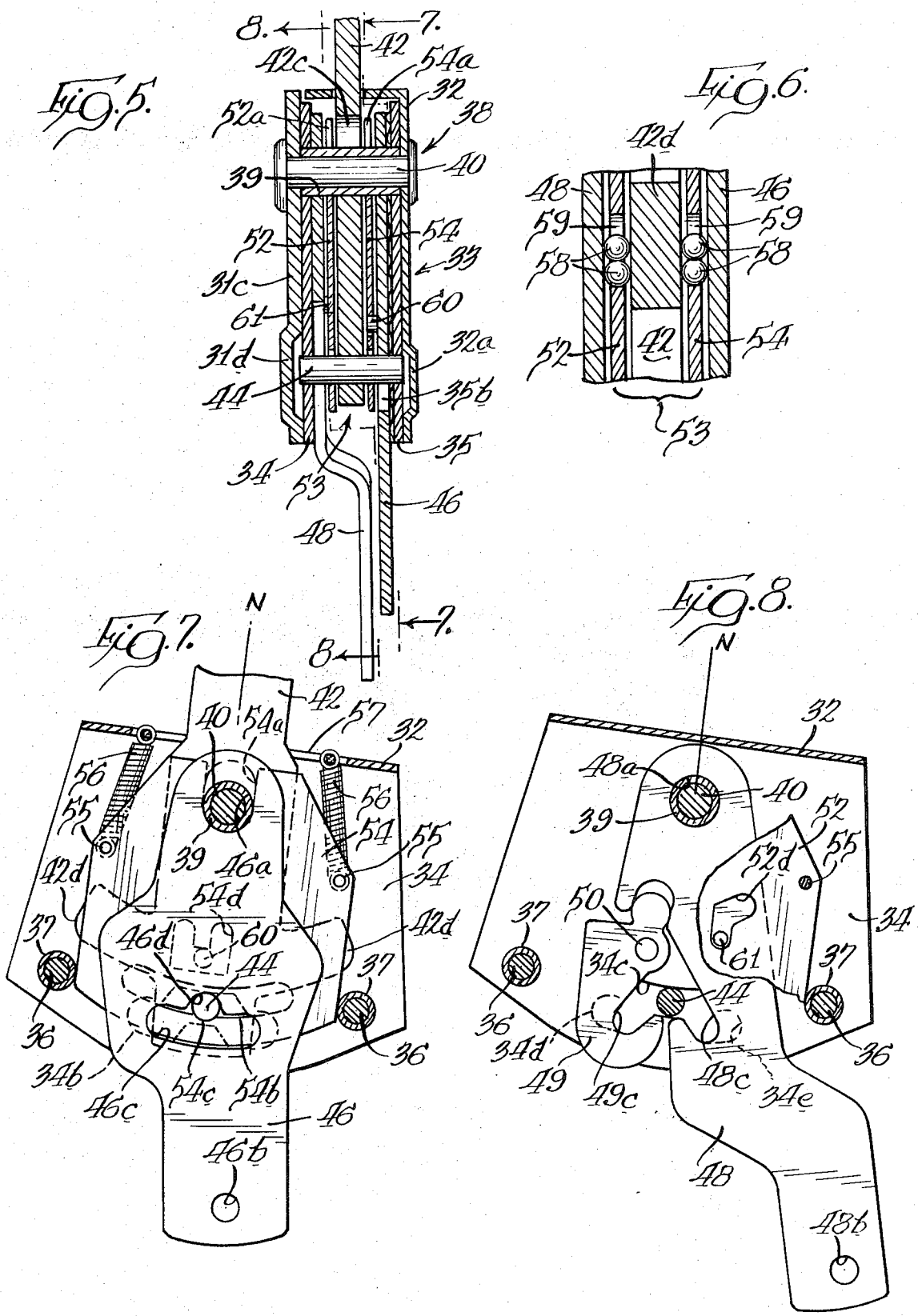

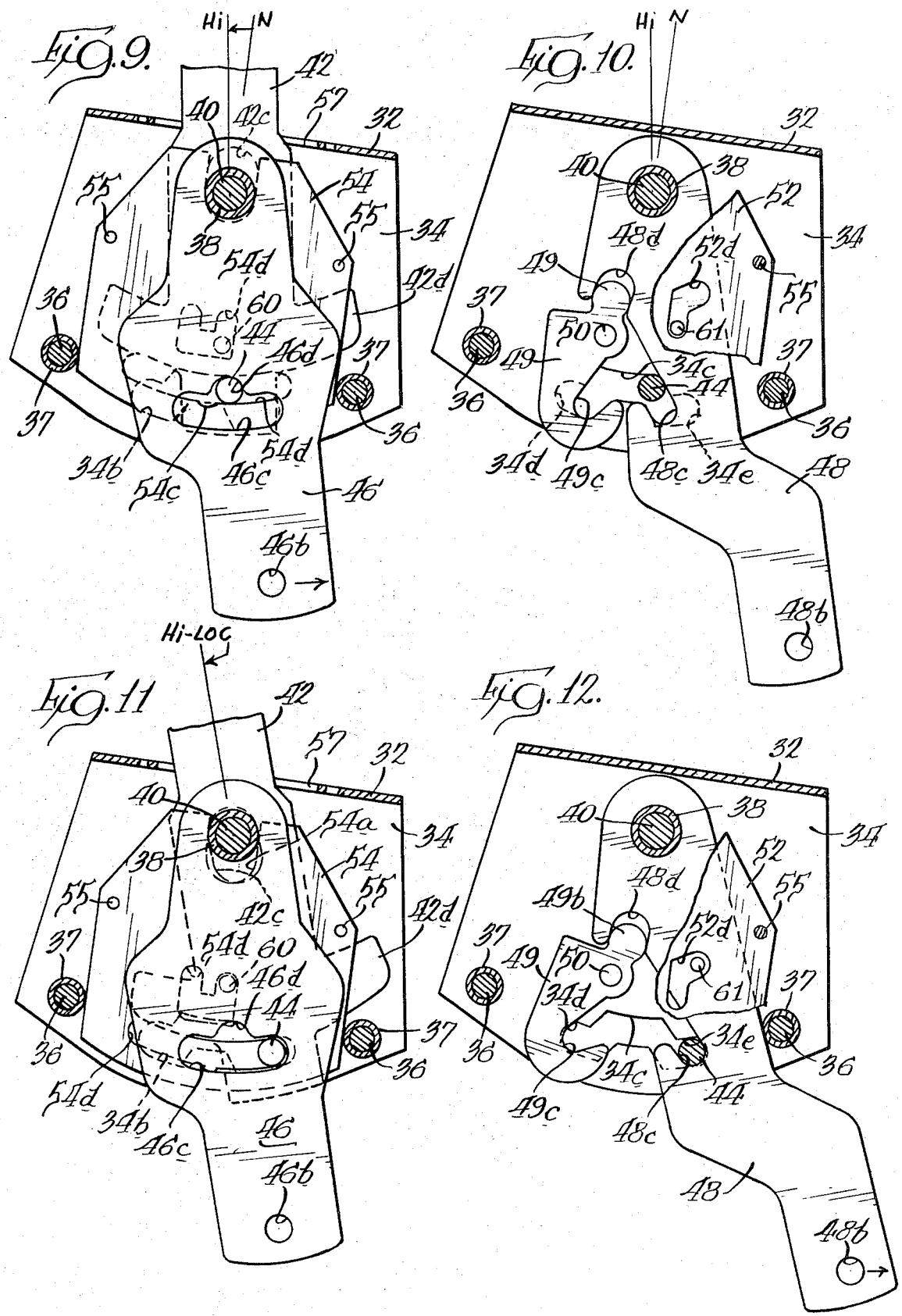

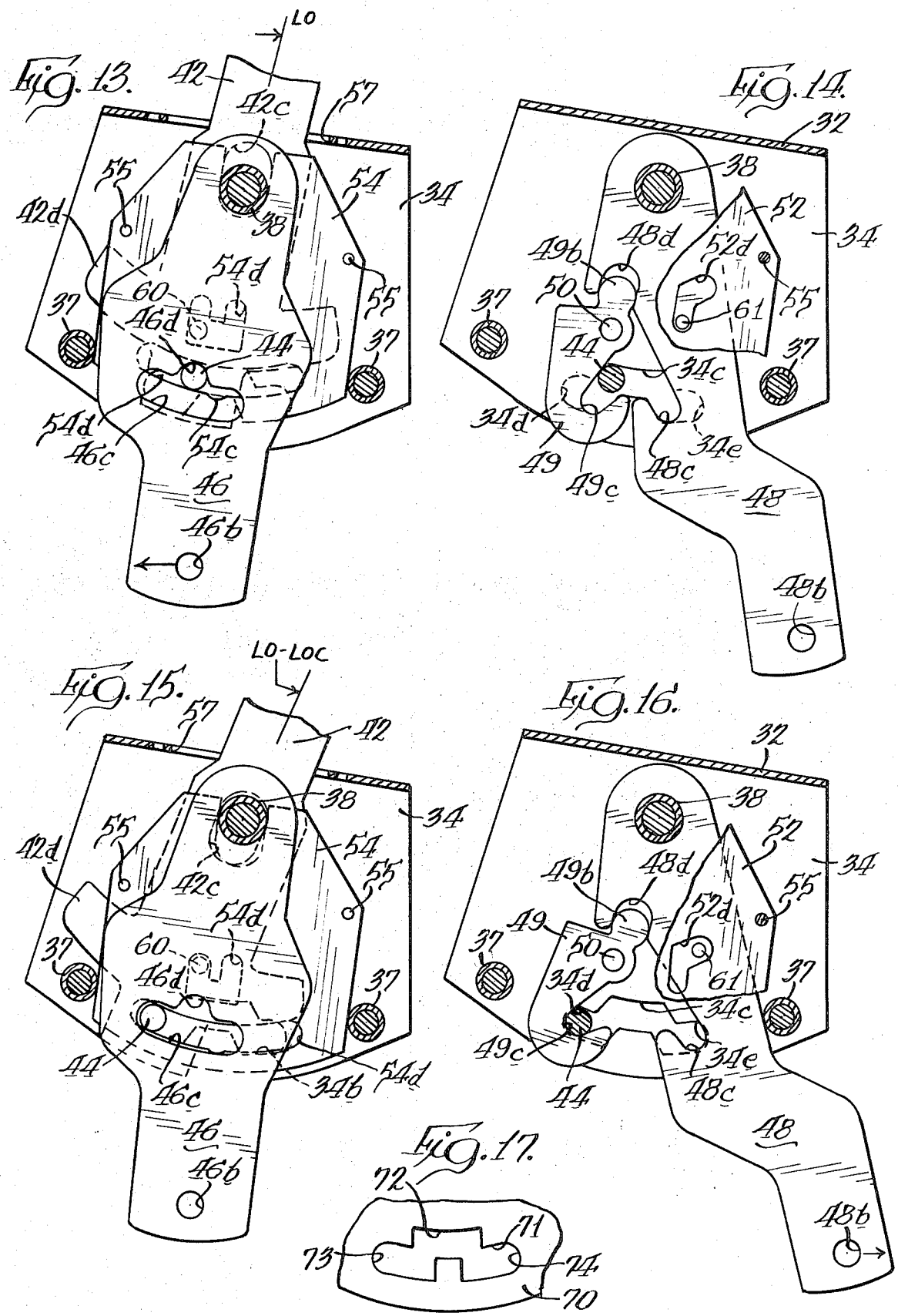

UNITARY STICK TRANSFER CASE SHIFTER

BACKGROUND OF THE INVENTION

The invention relates to a unitary stick transfer case shifter which is usable on four-wheel drive vehicles which have become popular for over-the-road and off-the-road recreational use. These vehicles are provided with a so-called "full time" four-wheel drive which means that the vehicle's drive is always coupled to both the front and the rear axles.

It is well known that four-wheel drive over-the-road vehicles require a differential drive mechanism between the power plant and the front and rear axles so that slippage may occur. If such slippage is not provided and the front and rear axles must turn at exactly the same speed, there results excessive tire wear and other related problems. However, in off-the-road applications when a four-wheel drive vehicle is operating is loose sand, snow, mud and the like, it is desirable that no differential drive be provided between the front and rear axles since such differential drive would result in severe loss of traction. In such off-the-road conditions the axle at which the greatest slipping or skidding would occur would receive all of the driving power whereas the axle having the better traction would receive none of the driving power. Accordingly, it is desirable to lock the differential out or prevent it from operating in such situations.

Conventionally, the differential for the four-wheel drive vehicle is located in a transfer case which also provides an additional range of gearing between the conventional engine transmission and the axles of the vehicle. The transfer case conventionally permits a direct drive with no gear reduction or, alternatively, permits the use of a two-to-one reduction which will adapt the vehicle to be operated at a very low gear ratio. It has been common to provide several separate control levers on the transfer case to regulate the gearing range and to either lock the differential or provide the differential operation between the front and rear axles.

In any shifter or transmission control mechanism it is desirable to provide as simple an operating mechanism as possible so as to require a minimum amount of attention and manual dexterity by the operator. While various shift patterns are provided in many shifters, it is often desirable to provide a straight or inline shift pattern wherein the manual control need only be moved forwardly and rearwardly to shift the transmission to its various modes of operation. Examples of shifters of this type are shown in Almquist, Jr. U. S. Pat. No. 3,057,222 and Marshall U.S. Pat. No. 2,961,890. These patents disclose shifters which have an inline motion to control several different operating levers on a transmission. In each case, however, the transmission is required to position one of the operating levers in a neutral position before controlling the other. Another somewhat related prior art patent is Shawley et al. U.S. Pat. No. 2,933,947 which shows a single control lever for a transfer case in a four-wheel drive vehicle. While utilizing a single control lever the shifter mechanism of the Shawley et al patent lacks much of the flexibility and advantages of Applicant's invention and, accordingly, would be unsuitable for use in a full time four-wheel drive vehicle of the type described above.

SUMMARY OF THE INVENTION

The invention includes a manually operated control means which operates in a single plane to control the transfer case of a full time four-wheel drive vehicle for operation in either (1) differential locked/low gear range, (2) differential operation, low gear range, (3) neutral, (4) differential operation, high gear range, and (5) differential locked, high gear range. The manual control means operates a shift control lever which in turn drives either of two shift arms which are linked to the controls on the transfer case. The shift control lever pivots on the same pin as the shift arms and is cammed vertically as it is pivoted so that it selectively controls one or the other of the shift arms throughout its range of movement. The shift control lever is also drivingly interconnected with an interlock plate assembly which biases the shift control lever upwardly and also locks one of the other of the shift arms against movement while the other is being operated by the shift control lever. This provides a simple and effective means for operating the two transfer case levers of a full time four-wheel drive vehicle with a control means operating in an inline pattern.

Accordingly, it is an object of the present invention to provide an improved shifter for a full time four-wheel drive vehicle;

It is a further object of the present invention to provide a unitary stick transfer case shifter which operats in an inline pattern to control the gear range and differential operation in a transfer case for a four-wheel drive vehicle;

It is another object of the present invention to provide an improved shift mechanism in which two transmission levers are controlled by a pair of shift arms with an interlock means immobilizing one of the shift arms in its selected position while the other shift arm is being operated.

Still another object of the present invention is to provide a simplified and improved shifter having a shift control lever which is guided and supported by interlock plates which function to lock one of the other of the two shift arms which are driven by the shift control lever.

Further objects and advantages of the present invention will become apparent as the following description proceeds and the features of novelty which characterize the invention will be pointed out with particularity in the claims annexed to and forming a part of this specification.

FIG. 3 is a vertical section taken on line 3—3 of FIG. 2;

FIG. 4 is an exploded perspective view of the internal mechanism of the shifter with dashed lines provided to indicate the common axes for assembly of the parts;

FIG. 5 is a vertical section taken on line 5—5 of FIG. 2;

FIG. 6 is an enlarged sectional view taken on line 6—6 of FIG. 2;

FIG. 7 is a sectional view taken substantially along line 7—7 of FIG. 5 showing the gear range shift arm in the neutral position with the differential shift arm removed to simplify the showing;

FIG. 8 is a sectional view taken substantially along line 8—8 of FIG. 5 showing the differential shift arm in the neutral position;

FIG. 9 is a sectional view similar to FIG. 7 but showing the shift control lever and gear range shift arm in the high gear range, differential operating position;

FIG. 10 is a sectional view similar to FIG. 8 but showing the differential shift arm in the high gear range, differential operating position;

FIG. 11 is a sectional view similar to FIG. 7 but with the shift control lever and gear range shift arm shown in the high gear range, differential locked position;

FIG. 12 is a sectional view similar to FIG. 8 but with the differential shift arm shown in the high gear range, differential locked position;

FIG. 13 is a sectional view similar to FIG. 7 but with the shift control lever and gear range shift arm shown in the low gear range, differential operating position;

FIG. 14 is a sectional view similar to FIG. 8 showing the differential shift arm in the low gear range, differential operating position;

FIG. 15 is a sectional view similar to FIG. 7 showing the shift control lever and gear range shift arm in the low gear range, differential locked position;

FIG. 16 is a sectional view similar to FIG. 8 but showing the differential shift arm in the low gear range, differential locked position; and FIG. 17 is an enlarged fragmentary view of an alternative embodiment of the cam slot which receives the selector pin.

In describing the invention, reference is made to the various modes of operation of the transfer case referring to the high and low gear range. Actually, the high gear range conventionally provides a one-to-one ratio between the input drive and output drives whereas the low gear range conventionally provides a two-to-one reduction between the input drive and the output drives. It should be understood that any other selected gearing ratios could be employed. In describing the transfer case differential action reference is made to the differential being unlocked or operating in one position of the differential control lever; whereas in the alternative position, it is described as locked or nonoperational whereby the transfer case drives directly both the front and rear axles.

Figure 1:
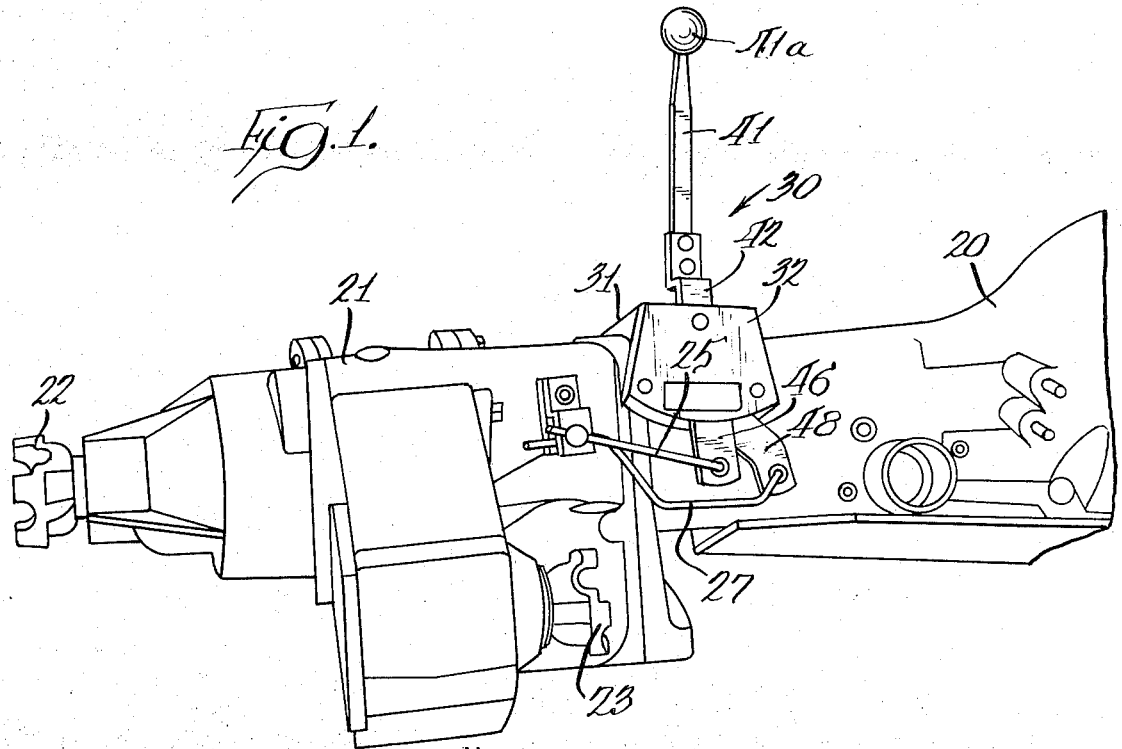
FIG. 1 is a perspective view showing the unitary stick transfer case shifter of the present invention assembled to the transfer case and transmission of a four-wheel drive vehicle.

Referring now to the drawings, there is shown in FIG. 1 a transmission 20 which is drivingly related to a transfer case 21. The transfer case 21 is of a conventional type currently employed on full time four-wheel drive vehicles such as are designed for over-the-road and off-the-road use. The transfer case 21 has a rearwardly extending output drive 22 which would drive a rear axle and a forwardly projecting output drive 23 which would drive the front axle. The transfer case 21 includes a differential mechanism whereby the drive from the transmission 20 may be delivered to the output drives 22 and 23 without a direct connection thereby permitting a slippage or different rates of rotation in the two output shafts. In addition, the transfer case 21 includes selective gear ranges whereby the output drives 22 and 23 may be direct coupled to the output of transmission 20 with no gear reduction or alternatively a two-to-one reduction may be accomplished in the transfer case 21.

To achieve the different modes of operation in the transfer case 21, there are provided control rods 25 and 27 which operate the gear range selector and the differential locking mechanism, respectively. As shown in FIG. 1 the gear range selector rod 25 would be in its high range position when moved toward the right of the position shown therein and the low range position when moved toward the left. The differential locking mechanism rod 27 is moved to the right from the position shown in FIG. 1 to move it to the locked or nonoperating differential position. In the position shown, the rod 27 is in its unlocked or in its operating position.

As shown in FIG. 1 a shifter 30 embodying my invention is mounted on the transmission 20. The shifter 30 includes a somewhat L-shaped supporting frame 31 and a cup-shaped cover member 32. As is best shown in FIG. 3, the frame 31 includes a leg 31a which projects across the top of the transmission 20 and a vertically extending mounting web 31b which is bolted to the transmission to mount the shifter 30. The frame 31 also includes a plate portion 31c which extends perpendicular to the web 31b and forms with the cup-shaped cover 32 a housing 33 for the shifter mechanism.

Secured within the housing 33 formed by the cover 32 and the support frame plate portion 31c are a pair of cam plates 34 and 35, 34 being the rear cam plate which is secured directly to the plate portion 31c and 35 being the front cam plate which is secured to the inside front wall of the cover 32. The cover 32 is secured to the plate portion 31c by bolts or rivets 36 which extend through spacing posts 37 and the pivot member 38 which again consists of a spacing sleeve 39 and a rivet 40 as is best shown in FIG. 5.

The shifter mechanism 30 is operated by a conventional control member 41 as shown in FIG. 1 having a manual operating knob 41a. The lower end of the control member 41 is provided with apertures and is bolted to the upper end of a shift control lever 42 which is mounted for pivotal movement on the pivot member 38. The control lever 42 is formed with an off-set 41a which is designed to suitably position the control member 41 with respect to the interior of the vehicle on which the shifter 30 is mounted. The shift control lever 42 is formed with a body portion 42b in which there is formed an elongated opening 42c through which the pivot member 38 extends. The width of the opening 42c is such that it snugly receives the pivot member 38 but permits a small amount of longitudinal or vertical movement by the lever 42. At its lower end the lever 42 is provided with laterally extending webs 42d which are necessary to prevent twisting of the lever 42 and assure smooth operation in a single plane. Centrally located at the lower end of the control lever 42 is a selector pin 44. The purpose of the selector pin 44 is to guide the control lever 42 in its pivotal and longitudinal movement and also to operate on the portions of the shifter mechanism which drive the gear range selector rod 25 and the differential locking mechanism rod 27.

To understand first how the movement of the lever 42 is controlled by the selector pin 44, reference should be made to the exploded perspective of FIG. 4 in which the cam plates 34 and 35 are shown at the top and the bottom thereof. These plates are fixed within the housing 33 formed by the cover 32 and the plate portion 31c of the support frame 31. The pivot member 38 extends through openings 34a and 35a located at the upper edges of the cam plates 34 and 35. At their lower central portions the cam plates are formed with irregular slots designated generally as 34b and 35b. These slots 34b and 35b are positioned to receive the outer ends of the selector pin 44. In the central positions of the control lever 42, the selector pin 44 travels in the upper portion of the slots which will be designated by reference numerals 34c and 35c. At either end of its travel, the selector pin 44 will be cammed down into the lower portions of the slots 34b and 35b. For reference purposes the left ends of the slots as shown in FIG. 4 will be designated 34d and 35d and the right ends designated 34e and 35e. It should be appreciated that the amount of travel by the control member 44 longitudinally as it is moved throughout the range of pivotal movement is relatively small, on the order of three-eighths of an inch as a consequence of the displacement between the central portions 34c, 35c and the lower, outer portions 34d, 34e and 35d, 35e.

The control means for the gear range selector rod 25 includes a gear range shift arm 46 the shape of which is best shown in the perspective view of FIG. 4. The gear range shift arm 46 is formed at its upper end with an opening 46a through which the pivot member 38 extends to support the shift arm 46 for pivotal movement. At its lower end the shift arm 46 is formed with an opening 46b by means of which connection is made to the selector rod 25. As is shown in FIG. 1 intermediate its ends, the shift arm 46 is formed with an arcuate slot 46c which has a notch 46d formed in the upper middle portion thereof. The slot 46c is adapted to receive the forwardly extending end of the selector pin 44 which thereby controls the movement of the gear range shift arm 46. When the shift control lever 42 is in its uppermost position, the selector pin 44 is positioned within the notch 46d as is shown in FIGS. 7, 9 and 13. In this position the shift control lever 42 is directly coupled to the gear range shift arm 46 so that the two move as a unit.

As will be explained more fully below in connection with the various figures of the drawings, the shifter 30 is designed so that the control member 41 has a central neutral position from which it may be moved in one direction into low gear range either in locked or unlocked differential positions and in the other direction to high gear range either in locked or unlocked differential positions. The positions immediately adjacent the neutral are the low and high gear ranges and both with the differential operating or unlocked. To appreciate the manner in which the shift control lever 42 moves the gear range shift arm 46 to both the high and low positions reference should be made to FIGS. 7, 9 and 13. FIG. 7 shows the gear range shift arm 46 and the shift control lever 42 in the central or neutral position. FIG. 9 shows the shift control lever 42 and the gear range shift arm 46 in the high gear range position wherein the shifter arm 46 has been pivoted counter-clockwise a small amount from the position shown in FIG. 7. It should be noted that the selector pin 44 is still positioned within the notch 46d in the shift arm 46. Similarly in FIG. 13 the selector pin 44 is still within the notch 46d but the shift control lever 42 and the gear range shift arm 46 have been pivoted clockwise as shown in FIG. 13 from the neutral position shown in FIG. 7.

For the purpose of controlling the differential locking mechanism rod 27, there is provided a differential shift arm 48 the general shape of which may be best seen in FIG. 4. The differential shift arm 48 is formed at its upper end with an opening 48a through which the pivot member 38 extends to support the shift arm 48 for pivotal movement. At its lower end the shift arm 48 is provided with an opening 48b which permits connection to the differential locking mechanism rod 27 as shown in FIG. 1. Intermediate its ends the shift arm 48 is formed with an angled slot 48c which is adapted to receive the selector pin 44 as it moves downwardly and to the right end of its travel.

Positioned adjacent to the shift arm 48 is a differential shift idler arm 49. The idler arm 49 is formed with an opening 49a by means of which it is pivotally mounted on a pin 50 formed on the rear cam plate 34 as shown in FIG. 4. The upper end of the idler arm 49 is formed with a rounded projection 49b which is adapted to be received in a recess 48d formed in the differential shift arm 48. With the differential shift arm 48 pivotally mounted on the pivot member 38 and the idler arm 49 pivotally mounted on the pin 50, the projection 49b through its inter-engagement with the recess 48d pivotally relates the shift arm 48 and the idler arm 49 to provide a scissors-like mechanism. The lower end of the idler arm 49 is formed with an angled slot 49c which is of the same hook-shaped configuration as the slot 48c formed in the shift arm 48. The slot 49c is adapted to receive the selector pin 44 when the shift control lever 42 moves to the limit of its movement in a clockwise direction. The purpose of the shift arm 48 and the idler arm 49 is to move the differential locking mechanism rod 27 in the same direction, i.e., to the differential lock position, at both ends of the extent of travel of the shift control lever 42. The manner in which this is accomplished will become more evident as the explanation is related to the various figures of the drawings.

In considering the operation of the differential shift arm 48, reference should be made to FIG. 10 and 12. FIG. 10 shows the selector pin 44 in the position it assumes when the shift control lever 42 is in the high gear range, differential operating position. As the shift control lever 42 is rotated counterclockwise from the position it would have in FIG. 10, the cam slots 34b and 35b cause the selector pin 44 and the control lever 42 to move downwardly as the selector pin 44 moves into the ends of the cam slots 34e and 35e as shown in FIG. 12. As the selector pin 44 moves from the position shown in FIG. 10 to the position shown in FIG. 12, the selector pin enters the slot 48c formed in the differential shift arm 48 and also the selector pin 44 carries with it the differential shift arm 48 as it moves to the end 34e of the slot 34b. In the position shown in FIG. 12, the differential shift arm 48 has moved to the differential locked position.

To understand the manner in which the differential shift idler arm 49 operates, reference should be made to FIGS. 14 and 16. In FIG. 14 the selector pin 44 and the shift control lever are in the low gear range, differential operating position. It should be noted that the selector pin 44 is located in the upper portion 34c and 35c of the slots 34b and 35b. Although the front cam plate 35 is not shown in FIGS. 7 – 16, reference is made to the portions of cam slot 35b which correspond to portions of the slots 34b shown in these figures. As the shift control lever 42 is rotated clockwise, the selector pin 44 moves from the position shown in FIG. 14 to the position shown in FIG. 16. The cam slots 34b and 35b cause the selector pin 44 to move the shift control lever 42 downwardly as it is pivoted. During this movement the selector pin 44 moves into the slot 49c in the idler arm 49 causing the idler arm 49 to pivot clockwise about its mounting pin 50. As this movement occurs, the engagement between the projection 49b on the idler arm and the recess 48d on the differential shift arm causes the differential shift arm 48 to pivot counterclockwise, thus moving the differential locking mechanism rod 27 to its differential locking position.

Figure 2:
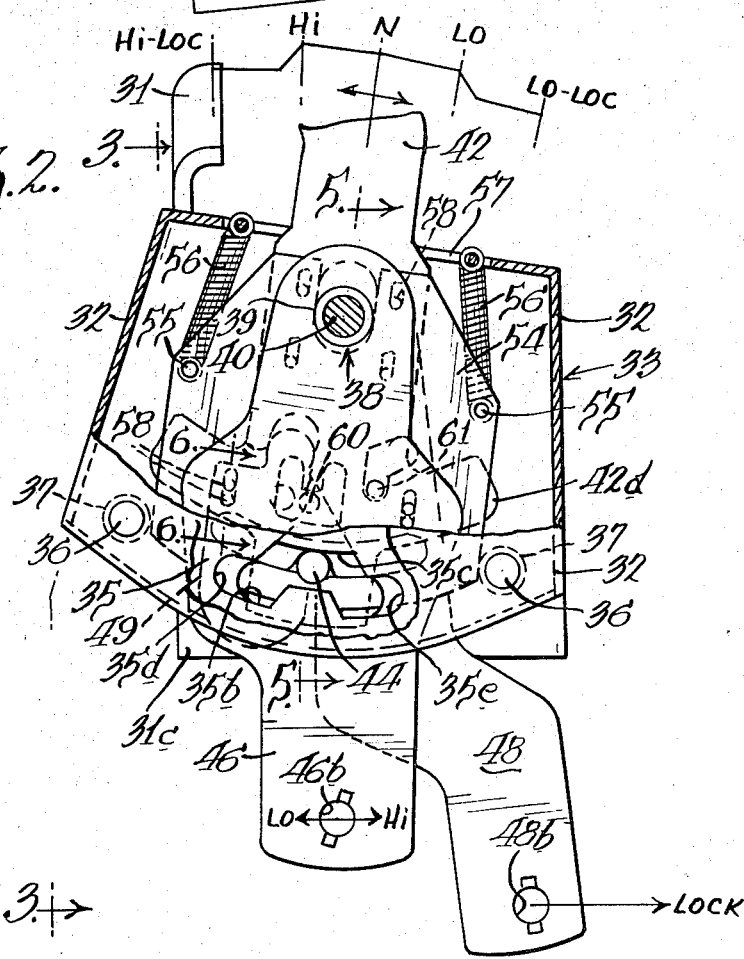
FIG. 2 is an enlarged side elevational view of the shifter of FIG. 1 with a portion of the housing cut away to expose the mechanism which is shown in the neutral position and there is indicated the various positions of the control means for various selected drive conditions.

In order to lock the shift arms in their selected positions, except during actual movement by the shift control lever, there are provided a pair of interlock plates 52 and 54; 52 being the rear interlock plate which operates on the differential shift arm 48, and 54 being the front interlock plate which operates on the gear range shift arm 46. The interlock plates 52 and 54 are positioned on either side of the shift control lever 42 and are secured together by means of a pair of spaced rivets 55 to form an interlock assembly 53. The plates 52 and 54 are urged upwardly within the housing 33 formed by the cover 32 and the plate portion 31c by springs 56 as best shown in FIGS. 2 and 3. The springs 56 are anchored at their lower ends to the rivets 55 and at the upper ends are connected through holes formed in the top wall of the cup-shaped cover 32. The cover 32 has an enlarged opening 57 through which the shift control lever 42 extends.

The interlock plates 52 and 54 serve a secondary function of guiding and supporting the shift control lever 42 by forming a cage for a plurality of ball bearings 58 as is best shown in FIG. 6. The ball bearings 58 are received in slots 59 formed in the interlock plates 52 and 54. The upper edge of the interlock plates 52 and 54 are formed with elongated slots 52a and 54a, respectively, which slots receive the pivot member 38 to guide the interlock plates 52 and 54 in vertical sliding movement. The plates 52 and 54 are also engaged on their outer vertical edges by the spacing posts 37 as best shown in FIG. 2 to guide the plates 52 and 54 for rectilinear sliding movement.

At their lower edges the inner lock plates 52 and 54 are formed with elongated arcuate slots 52b and 54b. In addition, the slots 52b and 54b are formed at their centers with notches 52c and 54c in their lower walls. The slots 52b and 54b receive the selector pin 44 as it moves in its arcuate path. The springs 56 which urge the interlock plates 52 and 54 upwardly, also urge the shift control lever 42 upwardly through the engagement with the selector pin 44. As the shift control lever 42 moves up and down as the pin 44 moves along the cam slots 34b and 35b, the interlock plates 52 and 54 move up and down to accomplish their function of locking either one of the two shift arms while the other arm is being moved.

The purpose of the notches 52c and 54c is simply to provide a detent to hold the shift lever in the center neutral position during installation of the shifter 30. While it is conventional for the transfer case or transmission to include detenting means in connecton with the controls, the detent action provided by the notches 52c and 54c as they engage the selector pin 44 simply retains the various parts of the shifter mechanism in the neutral position during installation.

This interlock function performed by the interlock assembly 53 is accomplished by virtue of pins formed on the shift arms 46 and 48 which extend in the interlock plates to guide and limit the type of movement to which the shift arms may be subject as the control member 41 is operated. More specifically, and referring again to FIG. 4, it is noted that the gear range shift arm 46 is provided with a downwardly extending pin 60 which is adapted to engage in a U-shaped opening 54d formed in the front interlock plate 54. It should be understood that the gear range shift arm 46 has been cut away in the area above the slot 46c, as shown in FIG. 4, to show where the pin 60 is located even though it extends only from the inner or rear face of the shift arm 46. The pin 60 is best shown in the sectional view of FIG. 5. By making reference to FIGS. 7, 9, 11, 13 and 14, the various positions assumed by the pin 60 within the slot 54d may be readily seen. In FIG. 7, the pin 60 is located at the bight of the U-shaped slot 54d, thus permitting the gear range shift arm 46 to swing in either direction about the pivot member 38 to either the position shown in FIG. 9 (high gear range, differential operation) or the position shown in FIG. 13 (low gear range, differential operation). In the last two mentioned positions, as shown in FIG. 9 and FIG. 13, the pin 60 has merely moved from one side to the other at the bight of the U-shaped slot 54d in the interlock plate 54. However, when the shift control lever 42 moves to the positions shown in FIGS. 11 and 15, the shift control lever moves downwardly and as a consequence of the engagement of the selector pin 44 with the slots 52b and 54b in the interlock plates 52 and 54, the interlock assembly 53 is caused to move downwardly along with the gear range shift arm 46. This causes the U-shaped slot 54d to move downwardly with respect to the pin 60 as shown in FIGS. 11 and 15.

In FIG. 11 with the shift control lever 42 in the high gear range, differential locked position, the pin 60 is trapped in the right leg of the U-shaped slot 54d thus preventing any movement of the gear range shift arm 46 at this time. This interlock eliminates the possibility of stones, rocks or any external forces displacing the gear range shift arm until the shift control lever is moved out of the differential lock position as shown in FIG. 11. Similarly, when the shift control lever 42 is in the low range, differential locked position, shown in FIG. 15, the pin 60 is positioned in the left leg of the U-shaped slot 54d thus locking the gear range shift arm 46 until the shift control lever 42 is moved out of the differential locked position. These interlocks minimize the possible damage to the transfer case by accidental or inadvertent displacement of the control means which are intended to remain in a fixed position at any particular time.

A similar interlock to that described above is provided for the differential shift arm 48. The shift arm 48 as shown in FIG. 4 is formed with a pin 61 which extends upwardly into a L-shaped slot 52 d in the interlock plate 52. In order to illustrate the action of the pin 61 within the slot 52d, FIGS. 8, 10, 12, 14 and 16 have been drawn with a fragmentary portion of the rear interlock plate 52 shown. This portion of the interlock plate 52 is the portion which includes the L-shaped slot 52d.

When the shift control lever 42 is in the neutral position, the selector pin 44 and the differential shift arm 48 are in the position shown in FIG. 8. In this position it should be noted that the pin 61 on the differential shift arm 48 is received in the vertical portion of the L-shaped slot 52d so that the shift arm 48 is locked or restrained against pivotal movement about the pivot member 48. This locked condition also prevails as the shift control lever 42 is moved to the high gear range position as shown in FIG. 10. It is not until the shift control lever 42 moves downwardly as illustrated by FIG. 12 that the interlock assembly 53 is also carried downwardly moving the slot 52d so that the pin 61 is then in the upper portion of the L-shaped slot 52d wherein the shift arm 48 may rotate about the pivot member 38.

Similarly, on the opposite direction of travel of the shift control lever 42, as is illustrated by FIGS. 14 and 16, the pin 61 engaged in the slot 52d locks the shift arm 48 against pivotal movement while the shift control lever 42 is in the low gear range, differential operating position. It is only when the lever 42 is moved to the low gear range, differential locked position as shown in FIG. 16 that the interlock plate 52 moves downwardly, thereby freeing the pin 61 from the vertical portion of the slot 52d and permitting pivotal movement of the differential shift arm 48. This interlocking arrangement of the shift arm 48 assures that no external forces, such as a thrown rock will move the differential control from the operating to the locked position until the shift control lever is moved to the limits of its travel in either direction, thereby releasing the interlock plate 52 from locked engagement with the pin 61. In this position as released by the interlock plate, the shift arm 48 is held securely by the shift control lever 42.

In FIG. 2 there is shown the center line of the shift control lever 42 for the various modes of operation of the shifter 30. In the left-hand most position of the shift control lever 42 the transfer case is in the high gear range, differential locked position. The next position to the right marked "HI" is the high gear range, differential operating position. On the other side of the neutral positon is the low gear range, differential operating position which is marked "LO." The farthest position to the right is indicated as "LO/LOC" and is the low gear range, differential locked position. The line extending adjacent the position indicia indicates the manner in which the shift control lever moves vertically as the lever moves from one position to another. As indicated above, the total travel is on the order of three-eighths inch vertically and consequently is comparatively unnoticed by the operator.

If it is desired to provide a sharper and more controlled movement between the various positions, the slots 34b and 35b can be formed as shown in FIG. 17 eliminating the angled transition between the upper portions and the lower portions of the slot. In this embodiment, front and rear cam plates 70 are formed with slots 71 having upper portions 72 and end portions 73 and 74. As the selector pin 44 moves to the end of the upper portion 72, it would be necessary to apply axial pressure downwardly to move the selector pin 44 into either of the end portions 73 or 74. Such an arrangement might be preferred to prevent the operator from unconsciously moving the shift control lever 42 into the differential locked position.

As has been explained above, the shifter mechanism is contained in the housing 33 which is formed by the support frame 31 and the cup shaped cover 32. In order to take up the tolerances between the parts sandwiched therein and prevent rattling of the parts, there is provided a wave plate or spring washer 63 as shown in FIGS. 3 and 4. The wave plate 63 is formed of a thin resilient material and has an undulating shape as shown in FIG. 3 so that it may apply pressure on and take up any extra space between the sandwiched parts. The wave plate 63 is formed with an upper opening 63a which is received on the pivot member 38.

In order to permit the selector pin 44 to extend entirely through the cam plates 34 and 35, it is desirable to provide embossed clearance areas at 32a on the cup-shaped cover 32 and at 31d on the plate portion 31c of the frame 31 as is best shown in FIG. 5. The embossed portions 32a and 31d are sufficiently large to provide clearance for the ends of the selector pin 44 as it moves throughout its travel in the cam slots 34b and 35b formed in the cam plates 34 and 35 respectively.

The shifter design described above provides a simple and effective means of adapting a straight line shift motion to a transfer case mechanism having two controls to be operated in an unusual manner. It is necessary that the differential locking control be actuated while the gear range selector is in either the high or low gear range position. The differential shift arm with its idler arm permits the differential locking to be accomplished with the shift control lever moving in either direction. In addition, the interlock plates provide a simple means of locking whichever one of the shift arms is not connected to the shift control lever at any given time.

While there has been shown and described a single embodiment of the present invention, it will be apparent to those skilled in the art that numerous changes and modifications may occur, and it is intended in the appended claims to cover all such changes and modifications which fall within the true spirit and scope of the present invention.

What is claimed as new and desired to be secured by Letters Patent of the United States is:

1. A shift mechanism for use on a transfer case having a high and low gear range drive and a differential mechanism which may be selectively locked or operative comprising a housing enclosing pivot means for mounting a shift control lever a gear range shift arm and a differential shift arm for pivotal movement about a common axis, said shift lever extending upwardly from said housing and having a manual control means connected thereto, said control means being movable between a central neutral position to adjacent first and second control positions comprising high and low gear range drive positions on either side of said neutral position, selector means for interconnecting said lever and said gear range shift arm in said neutral and in said high and low gear range drive positions, said control means being movable from said high gear range position to a third control position adjacent to but more remote from said neutral position than said high gear range position, means for disengaging said selector means from said gear range shift arm and connecting said lever to said differential shift arm and rotating said differential shift arm to a position for locking said transfer case differential when said control means is moved from said high gear range drive position to said third control position, said control means being movable from said low gear range position to a fourth control position adjacent to but more remote from said neutral position than said low gear range position, means for disengaging said selector means from said gear range shift arm and connecting said lever to said differential shift arm and rotating said differential shift arm to a position for locking said transfer case differential when said control means is moved from said low gear range drive position to said fourth control position.

2. The shift mechanism of claim 1 wherein interlock means are provided to lock said gear range shift arm against pivotal movement when said selector means disengages from said gear range shift arm and connects said lever to said differential shift arm.

3. The shift mechanism of claim 1 wherein interlock means are provided in said housing to lock against pivotal movement the one of said shift arms which is disconnected from said selector means and said shift control lever.

4. The shift mechanism of claim 1 wherein said selector means comprises a selector pin on said lever, said lever being movable in a direction normal to the axis of said pivot means to selectively connect said selector pin to either one of said shift arms, said differential shift arm having an idler arm pivotally connected to said housing and to said differential shift arm where said selector pin may drive said differential shift arm directly in a given direction and said selector pin may move in an opposite direction and drive said differential shift arm in said given direction through engagement with said idler arm.

5. A shift mechanism for a transfer case comprising a frame having pivot means for pivotally supporting for rotation on a common axis a shift control lever a gear range shift arm and a differential shift arm, a selector pin mounted on said lever spaced from said pivot means and extending parallel to the axis of said pivot means, said selector pin drivingly connecting said lever to either one of said shift arms, said lever being movable perpendicular to said pivot axis to selectively connect said selector pin with one or the other of said shift arms, cam means engageable with said selector pin to move said lever perpendicular to said pivot axis as it is rotated, interlock means connected to said selector pin and mounted for slidable movement with respect to said frame, said interlock means locking against rotation the one of said shift arms which is not being driven by said shift control lever.

6. The shift mechanism of claim 5 wherein said interlock means comprises a pair of interlock plates positioned on opposite sides of said shift control lever, said shift control lever comprising a plate-like member supported for pivotal movement by ball bearings retained in openings in said interlock plates, said shift arms comprising plate-like members positioned against said interlock plates in engagement with said ball bearings.

7. The shift mechanism of claim 5 wherein said interlock means comprises a pair of interlock plates, one of said interlock plates being positioned between said lever and said gear range shift arm and the other being positioned between said lever and said differential shift arm, interengaging pin and slot means on said shift arms and said interlock plates, said selector pin sliding said plates with respect to said shift arms to lock the one of said shift arms which is not being driven by said lever.

8. The shift mechanism of claim 7 wherein said differential shift arm is provided with a pin which extends into an L-shaped slot in one of said interlock plates, said gear range shift arm having a pin which extends into a U-shaped slot in the other of said plates.

9. The shift mechanism of claim 5 wherein said interlock means comprises a pair of interlock plates positioned on opposite sides of said lever, means securing said plates together in parallel spaced relation, spring means urging said plates upwardly with respect to said frame, slots in said plates receiving said selector pin whereby said spring means and interlock plates urge said lever upwardly, said cam means comprise cam plates positioned adjacent said shift arms and having slots in which the ends of said selector pin are received.

10. A shift mechanism for a transfer case of the type having a gear train with range control means movable between a first position for a high gear reduction and a second position for a lower gear reduction and having two power outputs from said transfer case with a selectively operable differential for delivering power to both outputs, the combination comprising a shift control lever mounted on a frame for pivotal movement in a single plane to control said gear train range control and said differential, a gear range shift arm pivotally mounted on said frame and adapted for connection to said gear train range control, a differential shift arm pivotally mounted on said frame and adapted for connection to means for selectively operating said differential, said shift control lever having a selector means for drivingly connecting said shift lever to either one of said shift arms, said shift control lever being pivotal to four spaced control positions two of which are in one direction from a neutral position and two of which are in the other direction from the neutral position, said selector means connecting said lever to said gear range shift arm in said neutral position to move said gear range shift arm and thereby move said range control to said first position or said second position as said lever is pivoted to either of the control positions adjacent said neutral position, movement of said lever to the control positions most remote from said neutral position engaging said selector means with said differential shift arm and rotating said differential shift arm to lock said transfer case differential out of operation.

* * * * *